United States Patent
Lukac et al.

(10) Patent No.: US 8,295,637 B2
(45) Date of Patent: Oct. 23, 2012

(54) METHOD OF CLASSIFYING RED-EYE OBJECTS USING FEATURE EXTRACTION AND CLASSIFIERS

(75) Inventors: Rastislav Lukac, North York (CA);
Christopher V Olekas, Toronto (CA);
Bojan Ljubuncic, Kitchener (CA)

(73) Assignee: Seiko Epson Corporation, Tokyo (JP)

( * ) Notice: Subject to any disclaimer, the term of this patent is extended or adjusted under 35 U.S.C. 154(b) by 961 days.

(21) Appl. No.: 12/350,037

(22) Filed: Jan. 7, 2009

(65) Prior Publication Data
US 2010/0172584 A1 Jul. 8, 2010

(51) Int. Cl.
*G06K 9/40* (2006.01)
*G06K 9/00* (2006.01)
*G06K 9/62* (2006.01)
(52) U.S. Cl. ......... 382/274; 382/117; 382/167; 382/156
(58) Field of Classification Search ............... 382/274, 382/117, 167, 190, 156
See application file for complete search history.

(56) References Cited

U.S. PATENT DOCUMENTS

| | | | |
|---|---|---|---|
| 6,278,491 B1 | 8/2001 | Wang et al. | |
| 6,728,401 B1 | 4/2004 | Hardeberg | |
| 6,754,390 B2* | 6/2004 | Dobeck | 382/228 |
| 6,912,298 B1 | 6/2005 | Wilensky | |
| 6,980,691 B2 | 12/2005 | Nesterov et al. | |
| 7,194,114 B2* | 3/2007 | Schneiderman | 382/118 |
| 7,764,846 B2* | 7/2010 | Marchesotti et al. | 382/274 |
| 7,903,870 B1* | 3/2011 | Budagavi | 382/162 |
| 2002/0136450 A1 | 9/2002 | Chen et al. | |
| 2003/0044178 A1 | 3/2003 | Oberhardt et al. | |
| 2004/0066966 A1 | 4/2004 | Schneiderman | |
| 2004/0114829 A1* | 6/2004 | LeFeuvre et al. | 382/275 |
| 2004/0184670 A1* | 9/2004 | Jarman et al. | 382/274 |
| 2004/0233299 A1 | 11/2004 | Ioffe et al. | |
| 2005/0047655 A1 | 3/2005 | Luo et al. | |
| 2005/0047656 A1* | 3/2005 | Luo et al. | 382/167 |
| 2005/0232490 A1 | 10/2005 | Itagaki et al. | |

(Continued)

FOREIGN PATENT DOCUMENTS

WO  2006054271 A2  5/2006

OTHER PUBLICATIONS

"A Fast Neural-Based Eye Detection System," Fok Hing Chi Tivive, et al, Proceedings of 2005 International Symposium on Intelligent Signal Processing and Communication Systems, Dec. 13-16, 2005 Hong Kong, pp. 641-644.*

(Continued)

*Primary Examiner* — Wenpeng Chen

(57) ABSTRACT

Disclosed are methods, devices, and computer program products for red-eye detection in an image. In one example embodiment, a method for detecting red-eye objects in an image includes several acts. First, a set of candidate red-eye objects identified in the image is received. Then, features are extracted from the candidate red-eye objects and, with a plurality of classifiers, a false red-eye object is eliminated from the set of candidate red-eye objects based on the extracted features. First and second ones of the plurality of classifiers are optimized for classifying objects in a first range of sizes using first and second ones of the extracted features, respectively. Furthermore, third and fourth ones of the plurality of classifiers are also optimized for classifying objects using the first and second ones of the extracted features, respectively, but for objects in a second range of sizes.

10 Claims, 6 Drawing Sheets

U.S. PATENT DOCUMENTS

| | | | | |
|---|---|---|---|---|
| 2006/0017825 A1* | 1/2006 | Thakur | | 348/242 |
| 2006/0072815 A1 | 4/2006 | Wu et al. | | |
| 2006/0204052 A1* | 9/2006 | Yokouchi | | 382/117 |
| 2006/0280361 A1* | 12/2006 | Umeda | | 382/167 |
| 2007/0036438 A1* | 2/2007 | Thakur | | 382/190 |
| 2007/0140556 A1* | 6/2007 | Willamowski et al. | | 382/167 |
| 2007/0263928 A1* | 11/2007 | Akahori | | 382/167 |
| 2008/0082468 A1* | 4/2008 | Long et al. | | 706/12 |
| 2008/0170778 A1* | 7/2008 | Luo | | 382/164 |

OTHER PUBLICATIONS

A Learning-Based Eye Detector Coupled with Eye Candidate Filtering and PCA Features, Bruno de Brito Leite, Eanes Torres Pereira and Herman Martins Gomes, Universidade Federal de Campina Grande, Luciana Ribeiro Veloso, Cicero Einstein do Nascimento Santos and Joao Marques de Carvalho, Universidade Federal de Campina Grande, Brazilian Symposium on Computer Graphics and Image Processing, Jan. 2007, (pp. 187-194).

Automatic Red-Eye Detection and Correction, Matthew Gaubatz, Cornell University, Robert Ulichney, Hewlett-Packard Co., IEEE ICIP, Jan. 2002, (pp. 1-804-1-807).

Automatic Redeye Removal for Smart Enhancement of Photos of Unknown Origin, Francesca Gasparini and Raimondo Schettini, Universita degli studi di Milano-Bicocca, Jan. 2006, (pp. 226-234).

Redeye Removal Using Flash and Non Flash Image Pairs, Georg Petschnigg, Website: http://graphics.stanford.edu/~georgp/RedEye/details.htm, Jun. 2002, (pp. 1-8).

Learning Color Constancy, Brian Funt, Vlad Cardei, Kobus Barnard, School of Computing Science, Simon Fraser University, Vancouver, Canada, Proc. IS & T/SID Fourth, Nov. 1996, (pp. 58-60).

Learning and Example Selection for Object and Pattern Detection, Kah-Kay Sung, Massachusetts Institute of Technology Artificial Intelligence Laboratory and Center for Biological and Computational Learning Department of Brain and Cognitive Sciences, Jan. 1996, (pp. 1-195).

\* cited by examiner

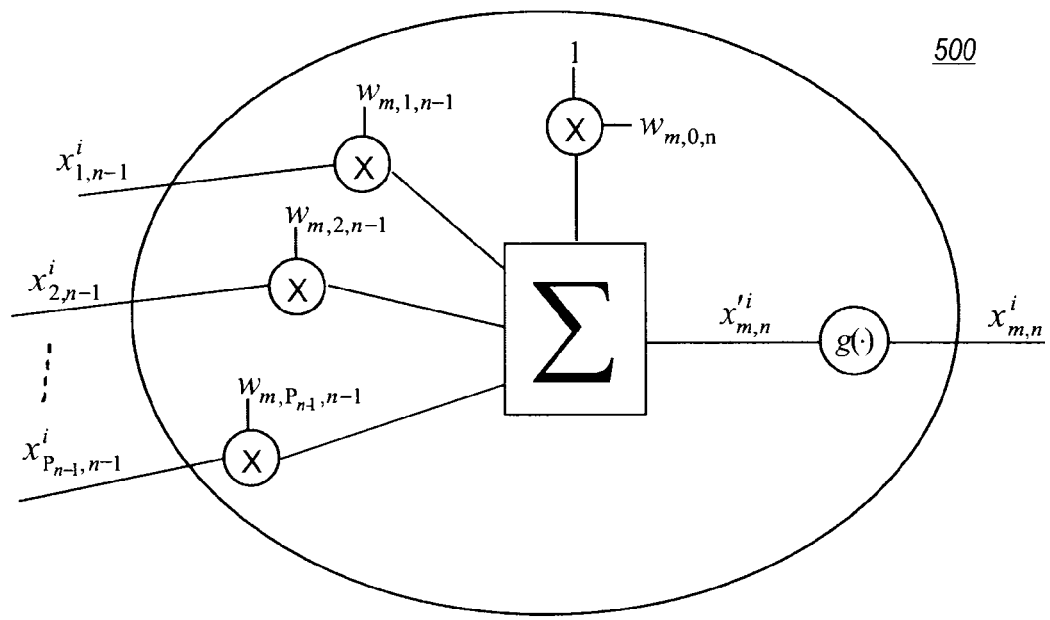
FIG. 5
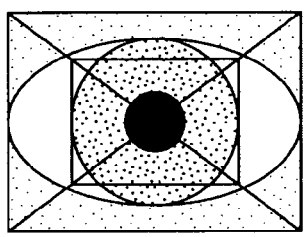   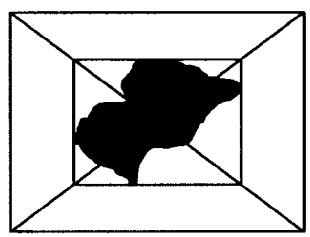   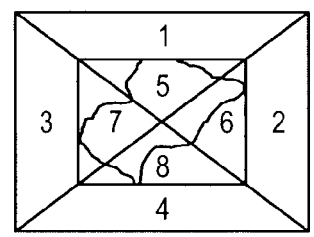
FIG. 6A   FIG. 6B   FIG. 6C

METHOD OF CLASSIFYING RED-EYE OBJECTS USING FEATURE EXTRACTION AND CLASSIFIERS

THE FIELD OF THE INVENTION

Embodiments of the invention relate to digital image processing. More specifically, disclosed embodiments relate to methods, devices, and computer-readable media for detecting and classifying red-eye objects in digital images.

BACKGROUND

Red-eye effects occur in images due to the ambient lighting conditions being relatively low when a flash is used. A human eye will adapt to the low lighting by dilating the pupil. When the photograph is captured, the light from the flash will enter the dilated pupil, illuminating red blood vessels in the retina. Red-eye detection is an image analysis technique used to localize the red-eye effects in digital color photographs captured using a flash.

Reliable red-eye detection is a difficult task. While red-eye detection in simple images can be straightforward, a more sophisticated approach is usually required in order to reduce the number of incorrectly detected red-eye objects, commonly known as false positives, in complex images. The task of deciding whether a candidate red-eye object is a true red-eye can be done using feature extraction methods and a trained classifier such as an artificial neural network.

Artificial neural networks are computational models based on biological neural networks. They are comprised of basic processing units called artificial neurons, which can be combined to model complex processes and systems. The input of the neural network is an array of features that describe the candidate red-eye object. When properly trained, a neural network classifier ("NNC") can take a feature vector of the candidate object and decide whether the object is a true red-eye or a false positive. However, as with other learning systems, the classification accuracy of an NNC may be insufficient when input images are too complex or candidate objects do not have features similar to that of training samples. Moreover, depending on the complexity of an NNC, computational efficiency can become impaired. Thus, improvements are needed in the area of red-eye detection with NNCs.

SUMMARY OF EXAMPLE EMBODIMENTS

In general, example embodiments relate to methods, devices, and computer-readable media for detecting a red-eye effect in digital images.

In a first example embodiment, a method for red-eye detection in an image includes several acts. First, a set of candidate red-eye objects identified in the image is received. Then, features are extracted from the candidate red-eye objects and, with a plurality of classifiers, a false red-eye object is eliminated from the set of candidate red-eye objects based on the extracted features. First and second ones of the plurality of classifiers are optimized for classifying objects in a first range of sizes using first and second ones of the extracted features, respectively. Furthermore, third and fourth ones of the plurality of classifiers are also optimized for classifying objects using the first and second ones of the extracted features, respectively, but for objects in a second range of sizes.

In a second example embodiment, a system for red-eye reduction in an image includes several elements. An object size discriminator in the system is configured to receive a group of candidate red-eye objects and to generate therefrom a first set of objects having a first range of sizes and a second set of objects having a second range of sizes. The system may also include first and second pluralities of feature extractors and corresponding trained classifiers configured to eliminate false red-eye objects from the first and second sets of objects, respectively. The objects remaining in the first and second sets after elimination by the trained classifiers may be passed to a simple classifier configured to further eliminate false red-eye objects. A filter may also be configured to eliminate false red-eye objects from the remaining objects.

In a third example embodiment, a method for red-eye detection in an image includes several acts. First, the method may include identifying a group of candidate red-eye objects in close spatial proximity to each other. Then, one of the objects in the group is determined to most likely be a red-eye object and the other one or more objects in the group are identified as non-red-eye objects.

In a fourth example embodiment, a method for red-eye detection in an image includes several acts. First, a candidate red-eye object may be received. Next, green intensity levels and blue intensity levels may be identified in the candidate red-eye object. The candidate red-eye object is identified as a red-eye object if an absolute difference between the green and blue intensity levels is less than a predetermined threshold.

In a fifth example embodiment, a red-eye detecting device includes various elements. The device includes a feature extractor configured to extract features associated with a candidate red-eye object in a digital image and a neural network classifier configured to receive the extracted features and decide whether to classify the object as a red-eye object. The extracted features include first and second features derived from red, green, and blue intensity values and a third feature derived from only green and blue intensity values.

In a sixth example embodiment, a red-eye detecting device includes various elements. The device includes a feature extractor configured to extract features from an object identified in a digital image, and a neural network classifier configured to receive the extracted features and decide whether the object is a red-eye object. The extracted features include features corresponding to a plurality of regions within and around the object.

In a seventh example embodiment, one or more computer-readable media have computer-readable instructions thereon which, when executed, implement the method for processing an image to detect red-eye effects discussed above in connection with the first example embodiment.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which:

FIG. 5 discloses an example neuron used in the neural network classifier architecture of FIG. 4;

FIGS. 6A-6C are various views of an example candidate red-eye object;

DETAILED DESCRIPTION

Figure 1:
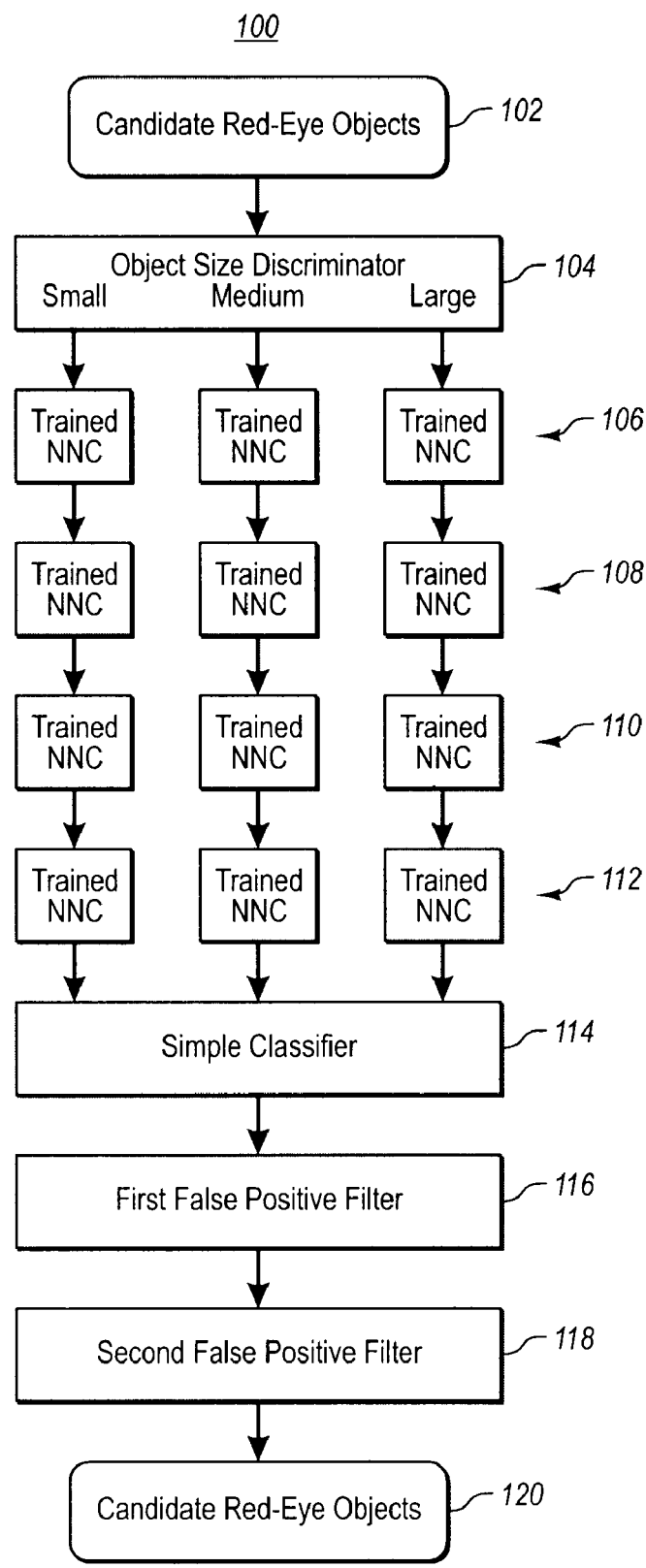
FIG. 1 discloses an example functional block diagram for processing a set of candidate red-eye objects.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for detecting red-eye objects in images. Example embodiments can be used to effectively and efficiently evaluate a set of candidate red-eye objects and eliminate false positives. Before application of the example embodiments described herein, a set of candidate red-eye objects may first be identified by an initial object pre-classification process. Methods consistent with the invention may be implemented in image capture devices such as scanners or digital cameras, as well as in software modules including printer drivers or image editing software, among other things.

Figure 2:
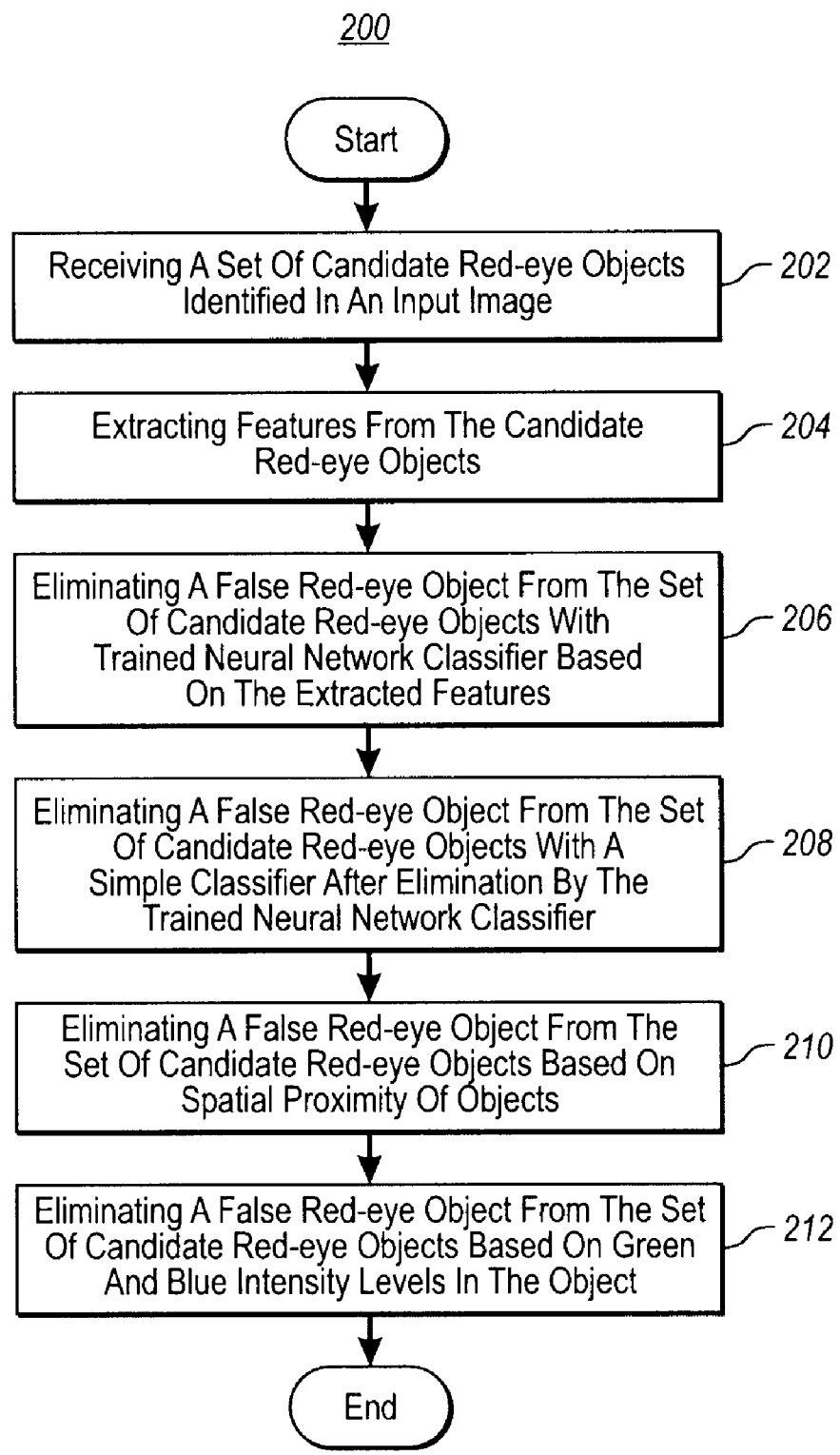
FIG. 2 discloses an example method for processing a set of candidate red-eye objects.

In FIG. 1 an example functional block diagram 100 for evaluating a set of candidate red-eye objects for false positives is disclosed. FIG. 2 shows an example method 200 that may be implemented by the example functional block diagram 100 to detect false positives in a set of candidate red-eye objects. A candidate red-eye object may be eliminated from the set based on various characteristics or features extracted from pixels in and/or around the object.

The example functional block diagram 100 and example method 200, as well as variations thereof disclosed herein, can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of an apparatus, such as a general purpose computer or a special purpose computer, to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a red-eye detection capability, for example, to detect and eliminate red-eye effects in an image. For example, an image capture device, such as a camera or scanner, with this red-eye detection capability may include one or more computer-readable media that implement the example method 200. Alternatively, a computer connected to the image capture device may include one or more computer-readable media that implement the example method 200.

Figure 3:
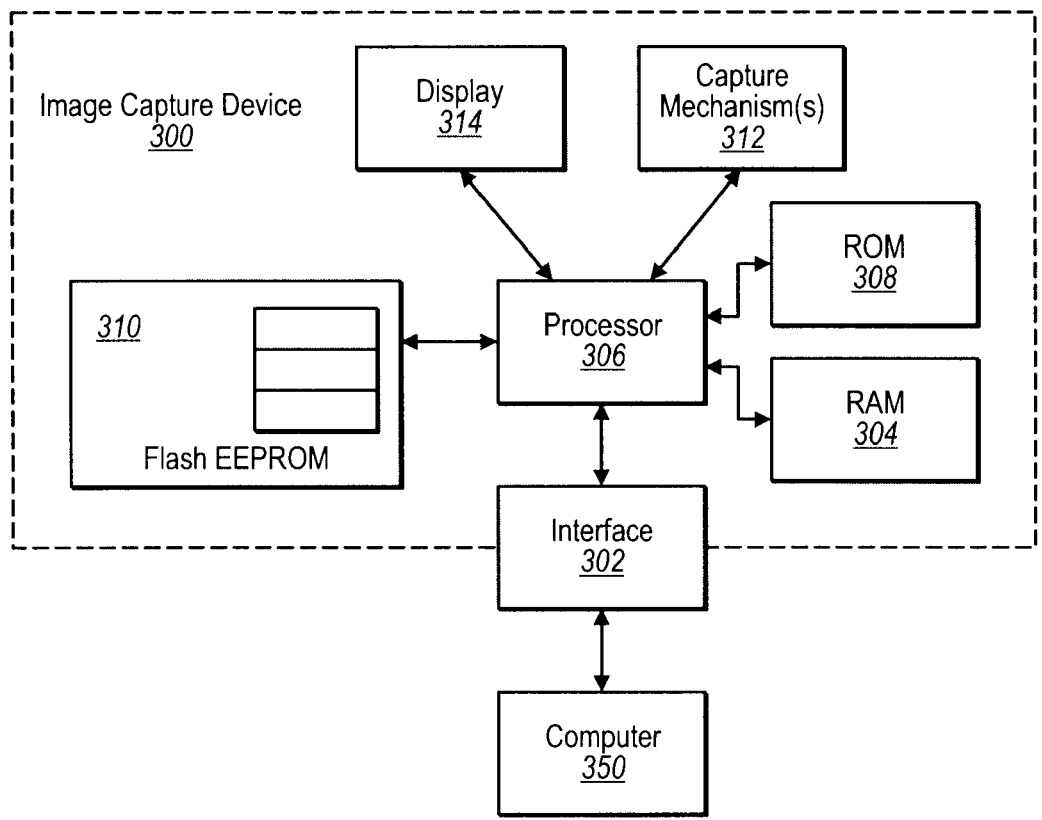
FIG. 3 is a schematic representation of an example image capture device.

A schematic representation of an example image capture device 300 is disclosed in FIG. 3. The example image capture device 300 exchanges data with a host computer 350 by way of an intervening interface 302. Application programs and an image capture device driver may also be stored for access on the host computer 350. When an image retrieve command is received from the application program, for example, the image capture device driver controls conversion of the command data to a format suitable for the image capture device 300 and sends the converted command data to the image capture device 300. The driver also receives and interprets various signals and data from the image capture device 300, and provides necessary information to the user by way of the host computer 350.

When data is sent by the host computer 350, the interface 302 receives the data and stores it in a receive buffer forming part of a RAM 304. The RAM 304 can be divided into a number of sections, for example through addressing, and allocated as different buffers, such as a receive buffer or a send buffer. Data, such as digital image data, can also be obtained by the image capture device 300 from the capture mechanism(s) 312, the flash EEPROM 310, or the ROM 308. For example, the capture mechanism(s) 312 can generate a digital photographic image. This digital image can then be stored in the receive buffer or the send buffer of the RAM 304.

A processor 306 uses computer-executable instructions stored on a ROM 308 or on a flash EEPROM 310, for example, to perform a certain function or group of functions, such as the method 200, for example. Where the data in the receive buffer of the RAM 304 is a digital image, for example, the processor 306 can implement the methodological acts of the method 200 on the digital image to improve accuracy of red-eye detection by eliminating false positives. Further processing in an imaging pipeline may then be performed on the digital image before the image is displayed by the image capture device 300 on a display 314, such as an LCD display for example, or transferred to the host computer 350, for example.

The example functional block diagram 100 for detecting red-eye effects in an image will now be discussed in connection with FIG. 1. The functional block diagram receives a set of candidate red-eye objects 102 and first classifies each candidate object according to size (e.g., small, medium, or large) with an object size discriminator 104. The objects are then processed by four trained neural network classifier ("NNC") stages 106-112, each stage consisting of three classifiers, one for each of the small, medium, and large groups of objects. Each successive stage of classifiers detects and eliminates false positives from the set of candidate red-eye objects 102. A simple classifier 114 then receives the refined set of objects from the trained classifier stages and refines the set even further using different techniques than in the classifier stages 106 to 112. Similarly, a first false positive filter 116 and a second false positive filter 118, each apply different techniques to refine the set of candidate red-eye objects 102 even further. As a result, a new set of candidate red-eye objects 120 is generated.

The classifiers 106-114 may include or be operably connected to feature extractors (not shown) to generate candidate red-eye object features. The feature extractors may partition a neighborhood of pixels in and around a candidate red-eye object into a number of feature regions arranged to facilitate identification of true red-eye characteristics by the classifiers. Depending on the selection of feature signals, each of the feature regions may be represented with statistics used to construct a feature vector. Extracted feature vectors can be used to train one or more of the trained classifiers 106-112 to achieve high classification rates and can be processed by the trained learning-based classifier stages 106-112 and the simple classifier 114 to decide whether a candidate object is a red-eye object.

The classification process may optionally include first and second false positive filters 116 and 118 that evaluate candidate objects left after classification by classifiers 106-114. The filters 116 and 118 may evaluate and eliminate objects based on their mutual spatial distance and characteristics of non-red pixels in the object.

Each of the classifying and refining stages outlined above are discussed in more detail below with reference to the block diagram 100 of FIG. 1 and the example method 200 of FIG. 2.

I. Identification of Candidate Red-Eye Objects

Prior to performing method 200 of FIG. 2, an input image can be targeted for various image processing operations including red-eye detection. The targeted input image may be a digital color photograph or a digitized or scanned version of a traditional (film) color photograph. Various image processing techniques may be applied to the targeted input image before method 200 is performed.

The input image may be a red-green-blue (RGB) color image x with $K_1 \times K_2$ pixels. The pixels in the input image x may be defined as $x_{(r,s)}=[x_{(r,s)1}, x_{(r,s)2}, x_{(r,s)3}]$, where $x_{(r,s)1}$, $x_{(r,s)2}$, and $x_{(r,s)3}$ denote the R, G, and B color components, respectively. The term (r,s) denotes the pixel location with $r=1, 2, \ldots, K_1$ and $s=1, 2, \ldots, K_2$ indicating the image row and column, respectively. In the description below, the color components corresponding to each pixel may have an intensity value ranging from a minimum of 0 to a maximum of 255 in a standard RGB color representation. However, as will be understood by those of ordinary skill in the art, the number of color components and their range may vary according to different color spaces and coordinate systems. Red-eye detection may be performed on the image x to extract a retina's pixels having a red coloration. The result of this detection may be a binary candidate red-eye pixel map d with $K_1 \times K_2$ pixels, where the value $d_{(r,s)}=1$ indicates that $x_{(r,s)}$ is a candidate red-eye pixel and $d(r,s)=0$ denotes that $x_{(r,s)}$ is not a candidate red-eye pixel.

The binary map d can be obtained by identifying the pixels $x_{(r,s)}$ with the dominant contribution of the red component. In the simplest form, the pixels in the binary map d can be set as $d_{(r,s)}=1$ for $x_{(r,s)1}>x_{(r,s)2}$ and $x_{(r,s)1}>x_{(r,s)3}$; otherwise $d_{(r,s)}=0$. Then, the map d can undergo a process called partitioning, labeling, or object segmentation to group adjacent pixels with $d_{(r,s)}=1$. Any suitable object segmentation algorithm may be carried out that groups candidate red-eye pixels (i.e., pixels with $d_{(r,s)}=1$) that are adjacent to each other. The object segmentation procedure may partition the map d into N one or more unique objects $O_i\{(r,s) \in \Phi_i; d_{(r,s)}{}^i=1\}$, for $i=1, 2, \ldots, N$, where N denotes the number of segmented objects, such that none of the partitioned objects is directly neighboring with another object from the set $\{O_i; i=1, 2, \ldots, N\}$. Each object may be characterized with $\Phi_i$, which is the set of pixel locations (r,s) where $d_{(r,s)}{}^i=1$, and a $\Phi_i{}^y \times \Phi_i{}^x$ bounding box with height $\Phi_i{}^y$ and width $\Phi_i{}^x$. Thus, any individual object $O_i$ can be seen as an image of dimensions $\Phi_i{}^y \times \Phi_i{}^x$ and can be considered separately from all other objects in the set $\{O_i; i=1, 2, \ldots, N\}$.

II. Classification of Objects Using Trained Classifiers

At 202, an act of receiving a set of candidate red-eye objects identified in an input image is performed. The set of candidate red-eye objects may be those identified by partitioning the binary map of pixels in which red is the dominant color component, as described above. Alternatively, an initial object pre-classification process may be performed on the set $\{O_i; i=1, 2, \ldots, N\}$. One example of an initial object pre-classification process is described in co-pending U.S. patent application Ser. No. 12/349,911, titled "METHOD OF DETECTING RED-EYE OBJECTS IN DIGITAL IMAGES USING COLOR, STRUCTURAL, AND GEOMETRIC CHARACTERISTICS," filed Jan. 7, 2009, the disclosure of which is incorporated herein by reference in its entirety.

At 204 and 206, an act of extracting features from the candidate red-eye objects and an act of eliminating one or more false red-eye objects from the set of candidate red-eye objects may be performed, respectively. The false red-eye objects may be identified based on the extracted features using a trained NNC (or a plurality of trained NNCs, as shown in FIG. 1). The trained NNC may classify candidate objects as either red-eyes objects or noise objects.

The trained NNC(s) may be formed according to an NNC architecture described in section II.A below with reference to FIGS. 4 and 5. Next, in section II.B, feature extraction is described in detail with reference to FIGS. 6A-6C and FIG. 7. Finally, training and configuration of an NNC is described in section II.C with reference to FIG. 8.

A. Neural Network Classifier Architecture

Figure 4:
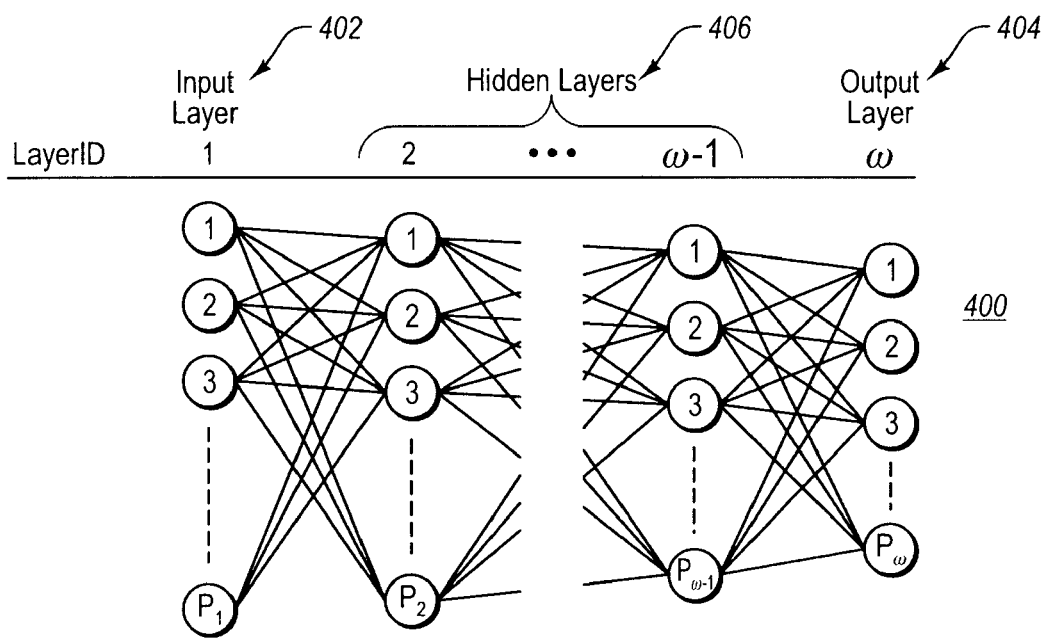
FIG. 4 discloses an example basic neural network classifier architecture.

FIG. 4 shows a basic NNC architecture 400 that may be used in performing act 206 to eliminate one or more false red-eye objects from the set of candidate red-eye objects. NNC architecture 400 is a feed-forward architecture that may include an input layer 402, an output layer 404, and one or more hidden layers 406. Each of the layers may include artificial neurons, an example of which is depicted in greater detail in FIG. 5.

According to one embodiment, the NNC used in connection with performance of act 206 may be a feed-forward NNC configured in accordance with the basic architecture depicted in FIG. 4. The trained classifier may have a plurality of input neurons in the input layer 402 and one or more hidden layers including a plurality of neurons. For example, in one embodiment each of the trained NNCs in FIG. 1 has 48 input neurons and 37 hidden layer neurons, whereas in another example embodiment, a single trained NNC having ten hidden layer neurons is used. In general, the output layer 404 can include a plurality of neurons; however, a single neuron that outputs a binary classification decision identifying an input object as either a red-eye object or a noise object is a reasonable choice in red-eye detection.

The input layer 402 may propagate a feature vector to the neurons of the first hidden layer without any pre-processing; that is, the input layer 402 may perform an identity operation on an inputted feature vector. Unlike the input layer 402, each neuron in a first one of the hidden layers 406 may combine features from all neurons in the previous layer, producing a vector used as the input for the next layer. Using the output of the previous layer as the input of the subsequent layer is a feature of feed-forward neural networks. The output layer 404 may combine the outputs of the neurons in the last hidden layer.

FIG. 5 shows a neuron 500 that may be used in the hidden and output layers of an NNC used in connection with performance of act 206. Neuron 500 may be used in the hidden layer and output layer to perform weighted-sum operations. For example, for an m th neuron in an n th layer of an ω-layer NNC, the data processing operation performed by the neuron 500 on the object $O_i$ can be defined as follows:

$$x'^i_{m,n} = \sum_{p=1}^{P_{n-1}} w_{m,p,n-1} x^i_{p,n-1} + w_{m,0,n} \qquad (1)$$

where $x'^i_{m,n}$ is an intermediate result, and $w_{m,0,n}$ is the neuron's bias. The term $P_{n-1}$ denotes the number of neurons in the (n−1)th layer; thus m=1, 2, ..., $P_n$ and n=1, 2, ..., ω. The term $w_{m,p,n-1}$ denotes a weight associated with the m th neuron and $x^i_{p,n-1}$ which is the output of the p th neuron in the previous, (n−1)th, layer. The $P_{n-1}$ inputs into a neuron define a $P_{n-1}$ dimensional input space where the weightings produce a hyperplane. The bias term $w_{m,0,n}$ may be included to ensure that the hyperplane does not pass through the origin, allowing for a less-constrained output. This occurs because each neuron's bias term is different.

The signal obtained in Equation (1) is passed through an activation function g(•). The activation function introduces non-linearity into the neural network, allowing for more complex classification boundaries and higher accuracy. Among several suitable shapes for the activation function, the neurons in both the hidden and output layers may use the following sigmoidal function:

$$x^i_{m,n} = g(x'^i_{m,n}) = \frac{1}{1 + e^{-x'^i_{m,n}}} \qquad (2)$$

where e stands for an exponent. The sigmoidal function may be used in hidden layer neurons to simplify training due to its easily-computed first derivative.

In addition, the sigmoidal function may be used in the output layer neuron to bound the NNC's output between 0 and 1, representing extreme confidence or probability values. For example, an output close to 1 may indicate that the object under consideration is probably a true red-eye and a value close to 0 may indicate a noise object with high probability. The output $x^i_{1,\omega}$ of the NNC may be evaluated, for example, by comparing it with a predetermined threshold Y. The relation $x^i_{1,\omega} \geq Y$ may indicate that the object $O_i$ under consideration is considered a red-eye object whereas $x^i_{1,\omega} < Y$ may indicate that $O_i$ is a noise object. The accuracy of such classification will depend at least in part on the choice of Y.

The data input to NNCs may be normalized between −1 and 1 to ensure that possible statistical outliers within the input data do not cause severe or unusual effects in the classifier. For a set of $N_{TOT}$ candidate objects $\{O_1, O_2, \ldots, O_{N_{TOT}}\}$, the normalization of an H-component feature vector $f_i=[f_{i,1}, f_{i,2}, \ldots, f_{i,H}]^T$ associated with the object $O_i$, where i=1, 2, ..., $N_{TOT}$ denotes the object's index and h=1, 2, ..., H denotes the index of the h th component $f_{i,h}$ of $f_i$, may be performed as follows:

$$f'_{i,h} = \frac{2 f_{i,h} - f_h^{max} - f_h^{min}}{f_h^{max} - f_h^{min}} \qquad (3)$$

where $f_h^{max}=\max\{f_{i,h}; i=1, 2, \ldots, N_{TOT}\}$ and $f_h^{min}=\min\{f_{i,h}; i=1, 2, \ldots, N_{TOT}\}$ represent, respectively, the maximum and the minimum of the set $\{f_{i,h}; i=1, 2, \ldots, N_{TOT}\}$ constituted by the h th components of all candidate objects' feature vectors. The result of the normalization process in Equation (3) is a vector $f'_i=[f'_{i,1}, f'_{i,2}, \ldots, f'_{i,H}]^T$ representing a normalized version of the feature vector $f_i$. The normalization formula given above in Equation (3) is only one example of a normalization formula. Other suitable normalization formulas can be used instead of Equation (3).

Parameters $f_h^{max}$ and $f_h^{min}$ are usually determined from a training set used to optimize an NNC, however, these parameters can also be obtained during the red-eye detection/classification process if such design characteristics are desired. Thus, $\{O_1, O_2, \ldots, O_{N_{TOT}}\}$ can be a set of objects pertaining to an input image. Alternatively, when training an NNC, the set of objects $\{O_1, O_2, \ldots, O_{N_{TOT}}\}$ can be a set of objects from an image database. In the latter case, $N_{TOT}$ denotes the number of candidate red-eye objects in the whole image database.

B. Feature Extraction

Referring again to FIG. 2, successful performance of the feature extraction act 204 depends on the selection of feature signals extracted from candidate red-eye objects and the selection of feature vectors (i.e., vector expressions of feature signals) used to represent the candidate objects.

Feature signals are selected to correspond to image characteristics that are relevant to red-eye detection and classification. Thus, features represented by the feature signals may include, among others, a redness feature, a brightness feature (such as a gray-scale value), and a feature derived from only green and blue pixel intensity values or color components. For an RGB pixel's color vector $x_{(\cdot,\cdot)} = [x_{(\cdot,\cdot)1}, x_{(\cdot,\cdot)2}, x_{(\cdot,\cdot)3}]^T$, the following feature signals $F_{(\cdot,\cdot)}^A$, for $A=1, 2, \ldots 12$, may be used:

$$F_{(\cdot,\cdot)}^1 = x_{(\cdot,\cdot)1}, F_{(\cdot,\cdot)}^2 = x_{(\cdot,\cdot)2}, F_{(\cdot,\cdot)}^3 = x_{(\cdot,\cdot)3} \quad (4)$$

$$F_{(\cdot,\cdot)}^4 = y_{(\cdot,\cdot)1}^{Lab}, F_{(\cdot,\cdot)}^5 = y_{(r,s)2}^{Lab}, F_{(\cdot,\cdot)}^6 = y_{(r,s)3}^{Lab} \quad (5)$$

$$F_{(\cdot,\cdot)}^7 = y_{(\cdot,\cdot)1}^{Luv}, F_{(\cdot,\cdot)}^8 = y_{(\cdot,\cdot)2}^{Luv}, F_{(\cdot,\cdot)}^9 = y_{(\cdot,\cdot)3}^{Luv} \quad (6)$$

$$F_{(\cdot,\cdot)}^{10} = 2x_{(\cdot,\cdot)1} - x_{(\cdot,\cdot)2} - x_{(\cdot,\cdot)3}, F_{(\cdot,\cdot)}^{11} = (x_{(\cdot,\cdot)1} + x_{(\cdot,\cdot)2} + x_{(\cdot,\cdot)3})/3, F_{(\cdot,\cdot)}^{12} = \min\{x_{(\cdot,\cdot)2}, x_{(\cdot,\cdot)3}\} \quad (7)$$

Feature signals in Equation (4) correspond to individual color components of $x_{(\cdot,\cdot)}$. Feature signals in Equation (5) and Equation (6) correspond to individual color components of vectors $y_{(\cdot,\cdot)}^{Lab} = [y_{(\cdot,\cdot)1}^{Lab}, y_{(\cdot,\cdot)2}^{Lab}, y_{(\cdot,\cdot)3}^{Lab}]^T$ and $y_{(\cdot,\cdot)}^{Luv} = [y_{(\cdot,\cdot)1}^{Luv}, y_{(\cdot,\cdot)2}^{Luv}, y_{(\cdot,\cdot)3}^{Luv}]^T$, which are color-space equivalents of the RGB pixel $x_{(\cdot,\cdot)}$ expressed in the perceptually-uniform International Commission on Illumination (CIE) Lab and CIE Luv color spaces, respectively. Finally, feature signals in Equation (7) correspond, respectively, to a redness value, a brightness or gray-scale value, and the minimum of the green and blue components of the color pixel $x_{(\cdot,\cdot)}$. It should be understood that Equation (4) to Equation (7) are examples of feature signal formulations. Other suitable feature signal formulations can be used instead of these equations.

FIGS. 6A-6C show various views of an example candidate red-eye object $O_i = \{(r,s) \in \Phi_i; d_{(r,s)}^i = 1\}$. FIG. 6A shows a model of an eye corresponding to object $O_i$, FIG. 6B shows a binary map of object $O_i$ in a bounding box, and FIG. 6C shows how a local neighborhood area of object $O_i$ may be partitioned into a plurality of regions labeled 1 through 8.

A feature vector $f_i$ may be derived from feature signals that are extracted from each of a plurality of regions of an object $O_i$ using samples from a local neighborhood area centered at the center of object $O_i$. The size of the local neighborhood may be proportional to the object size. The local neighborhood area may be partitioned into inner and outer portions of a square or rectangular shape, which may further be divided into quadrants, as shown in FIG. 6A. For example, the inner $\Phi_i^I$ and $\Phi_i^O$ portions of object $O_i$ may be defined as $$\Phi_i^I = \left\{ \begin{array}{l} (r, s); \min\{r \in \Phi_i\} \leq r \leq \max\{r \in \Phi_i\}, \\ \min\{s \in \Phi_i\} \leq s \leq \max\{s \in \Phi_i\} \end{array} \right\} \quad (8)$$

$$\Phi_i^O = \left\{ \begin{array}{l} (r, s); -\delta + \min\{r \in \Phi_i\} \leq r \leq \max\{r \in \Phi_i\} + \delta, \\ -\delta + \min\{s \in \Phi_i\} \leq s \leq \max\{s \in \Phi_i\} + \delta \end{array} \right\} \setminus \Phi_i^I \quad (9)$$

where $\delta$ is a padding parameter. Since candidate red-eye objects can significantly vary in size, the padding parameter may vary in proportion to ensure accurate feature extraction. For example, the padding parameter may be set to $\delta = \min(\text{int}\{(\Phi_i^y + \Phi_i^x)/4 + \alpha_\Phi, \beta_\Phi\}$ for medium to large objects satisfying $\Phi_i^y \Phi_i^x > \gamma_\Phi$, and may be set to $\delta = 2$ for small objects satisfying $\Phi_i^y \Phi_i^x \leq \gamma_\Phi$. (The operator int denotes a rounding to the nearest integer operator.) Parameters $\alpha_\Phi$ and $\beta_\Phi$ may be predetermined constants used to set the padding for the medium to large objects, whereas $\gamma_\Phi$ may be a predetermined setting to distinguish small objects from medium to large objects. For example, when classifying red-eye objects in QVGA-size images (i.e., 240×320 pixels), feature extraction may perform acceptably well with the following parameter settings: $\alpha_\Phi = 2$, $\beta_\Phi = 6$, and $\gamma_\Phi = 2$.

As shown in FIGS. 6A-6C, both inner and outer rectangle regions may be partitioned into quadrants with diagonal partitions, thus producing four inner and four outer feature regions with spatial locations described $\Phi_i^R$, for $R = 1, 2, \ldots, 8$. Thus, the four inner regions can be expressed as $\Phi_i^I = \Phi_i^5 \cup \Phi_i^6 \cup \Phi_i^7 \cup \Phi_i^8$ and the four outer regions can be expressed as $\Phi_i^O = \Phi_i^1 \cup \Phi_i^2 \cup \Phi_i^3 \cup \Phi_i^4$. The regions are partitioned in accordance with unique features and characteristics of red-eye objects, such as edges and transitions characteristic of red-eyes. For example, in regions 1 and 4 in FIG. 6C, a greater amount of red-eye region to skin transition pixels exist than in other regions. In regions 2 and 3 more sclera pixels than skin pixels are present. In regions 5 through 8 the majority of pixels are iris and pupil pixels, which contribute most significantly to the red-eye effect. Although candidate red-eye objects may not have the exact orientation described above, similar features can still be extracted, even if, for example, the red-eye object is rotated with respect to the orientation depicted in FIGS. 6A-6C.

Figure 7:
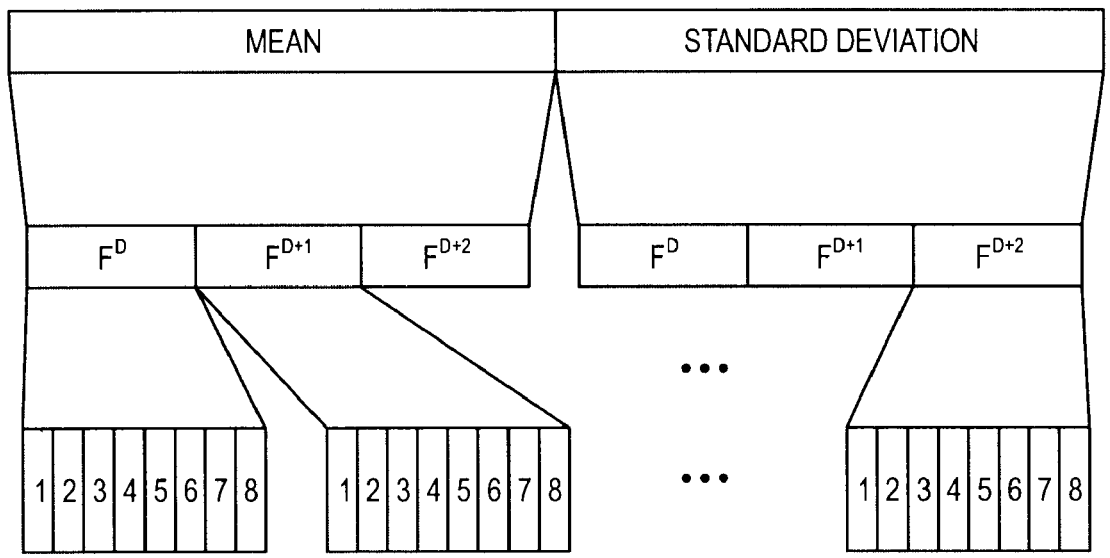
FIG. 7 is a graphical representation of an example feature vector extracted from a candidate red-eye object.

FIG. 7 shows a graphical representation of an example structure 700 for a feature vector. The structure 700 includes a top layer 702, a middle layer 704, and a bottom layer 706, which are discussed in detail below. Once the local neighborhood centered in an object $O_i$ has been partitioned into feature regions $\Phi_i^R$, where $R = 1, 2, \ldots 8$ in accordance with an example shown in FIGS. 6A-6C, and feature signals have been selected, feature vectors can be determined. Each of the components $f_{i,h}$ of a feature vector $f_i$, for $h = 1, 2, \ldots, H$, may correspond to a particular feature signal of pixels in a particular feature region $\Phi_i^R$. For example, an individual component $f_{i,h}$ of $f_i$ can represent a statistical indicator, such as a mean, of a feature signal for pixels in a given feature region $\Phi_i^R$. Alternatively, more complex feature extraction procedures can use standard deviation, entropy, or other measures, whether statistical or otherwise.

The top layer 702 of the feature vector structure 700 shows how one half of a 48-component feature vector can include 24 mean values and another half can include 24 standard deviation values. Furthermore, the bottom layer 706 demonstrates how each of the three feature signal segments can be partitioned into eight features corresponding to the eight regions $\Phi_i^R$ described above with reference to FIG. 6C. Thus, in accordance with the top layer 702 of the structure 700, a feature vector $f_i$ can include mean values $\mu_i^{A,R}$ and standard deviation values $\sigma_i^{A,R}$ calculated for each feature signal $F_{(\cdot,\cdot)}^A$ in a given feature region $\phi_i^R$ as follows:

$$\mu_i^{A,R} = \frac{1}{|\Phi_i^R|} \sum_{(r,s) \in \Phi_i^R} F_{(r,s)}^A, \quad \sigma_i^{A,R} = \sqrt{\frac{1}{|\Phi_i^R|} \sum_{(r,s) \in \Phi_i^R} \left(F_{(r,s)}^A - \mu_i^{A,R}\right)^2} \quad (10)$$

where $|\Phi_i^R|$ denotes the number of pixel locations in $\Phi_i^R$.

The middle layer 704 of the structure 700 shows how each of the other layers may be composed of three segments corresponding to three different feature signals. The feature extraction procedure may produce feature vectors expressing subsets (e.g., triplets) of the feature signals. Dividing the feature signals in this manner may decrease a convergence time for NNC training, which is discussed in more detail below in section II.C, and may increase reliability of subsequent classification results.

Therefore, as shown in FIG. 7, the length of feature vectors processed by each of the trained NNCs may be H=48 due to the inclusion of two different statistics (e.g., mean, standard deviation) calculated for three different feature signals in eight different feature regions (2×3×8=48). Using the four triplets of feature signals from Equation (4) to Equation (7), four feature vectors $f_i$ with components $f_{i,h}$ can be expressed, respectively, as follows:

$$f_i = [\mu_i^{1,1}, \ldots, \mu_i^{1,8}, \mu_i^{2,1}, \ldots, \mu_i^{2,8}, \mu_i^{3,1}, \ldots, \mu_i^{3,8},$$
$$\sigma_i^{1,1}, \ldots, \sigma_i^{1,8}, \sigma_i^{2,1}, \ldots, \sigma_i^{2,8}, \sigma_i^{3,1}, \ldots, \sigma_i^{3,8}]^T \quad (11)$$

$$f_i = [\mu_i^{4,1}, \ldots, \mu_i^{4,8}, \mu_i^{5,1}, \ldots, \mu_i^{5,8}, \mu_i^{6,1}, \ldots, \mu_i^{6,8},$$
$$\sigma_i^{4,1}, \ldots, \sigma_i^{4,8}, \sigma_i^{5,1}, \ldots, \sigma_i^{5,8}, \sigma_i^{6,1}, \ldots, \sigma_i^{6,8}]^T \quad (12)$$

$$f_i = [\mu_i^{7,1}, \ldots, \mu_i^{7,8}, \mu_i^{8,1}, \ldots, \mu_i^{8,8}, \mu_i^{9,1}, \ldots, \mu_i^{9,8},$$
$$\sigma_i^{7,1}, \ldots, \sigma_i^{7,8}, \sigma_i^{8,1}, \ldots, \sigma_i^{8,8}, \sigma_i^{9,1}, \ldots, \sigma_i^{9,8}]^T \quad (13)$$

$$f_i = [\mu_i^{10,1}, \ldots, \mu_i^{10,8}, \mu_i^{11,1}, \ldots, \mu_i^{11,8}, \mu_i^{12,1}, \ldots,$$
$$\mu_i^{12,8}, \sigma_i^{10,1}, \ldots, \sigma_i^{10,8}, \sigma_i^{11,1}, \ldots, \sigma_i^{11,8},$$
$$\sigma_i^{12,1}, \ldots, \sigma_i^{12,8}]^T \quad (14)$$

Each of the feature vectors above may be normalized during a training phase as well as during operation. Normalization may be performed using, for example, the procedure described above in Equation (3) to generate a vector $f'_i = [f'_{i,1}, f'_{i,2}, \ldots, f'_{i,H}]^T$ representing a normalized version of a corresponding feature vector $f_i$.

A normalized feature vector $f'_i$ may then be used as a set of inputs for a trained NNC with fixed weights $w_{m,p,n-1}$. The fixed weights may be determined by a previously performed training process, which is described further below in section II.C. The trained NNC with a single neuron in the output layer may then output a confidence level expressed as a value $x_{1,3}^i$, which may be compared to a threshold value Y to determine whether the candidate red-eye object $O_i$ from which normalized feature vector $f'_i$ is derived corresponds to a red-eye object or not. The threshold value Y may be chosen to maximize detection rate while minimizing a number of false positives. For example, setting the confidence threshold of each trained classifier to Y=0.99 may achieve acceptable results.

C. Configuration and Training of Neural Network Classifiers

As shown in FIG. 1, four trained NNC stages, corresponding to each of the four feature vectors in Equations (11) through (14) above, may be arranged in a cascaded configuration. The trained NNCs in a particular stage may have been previously trained or optimized with a particular feature vector extracted from a variety of training objects. Moreover, each of the four stages may include multiple (e.g., three) trained NNCs, trained or optimized to separately process variously sized objects. For example, FIG. 1 depicts each stage having three trained NNCs, one for each of three sizes including small (for $\Phi_i^y \Phi_i^x \leq 2$), medium (for $\Phi_i^y \Phi_i^x > 2$ to $\Phi_i^y \leq 3$ and $\Phi_i^x \leq 3$), and large (for all other combinations of $\phi_i^y$ and $\Phi_i^x$).

The order in which the classifiers are cascaded may vary depending on a particular application's circumstances and constraints. For example, where cost-efficiency is a high priority constraint, classifiers trained on computationally expensive feature signals may be placed at the bottom of the cascade where the number of candidate objects is expected to be lower as compared to an initial classification stage. Applying this rationale, and with each trained classifier's confidence threshold set to Y=0.99, acceptable classification performance may be achieved by configuring the first stage with classifiers trained on feature signals from Equation (4), followed by the classifiers trained on feature signals from Equation (5), followed by the classifiers trained on feature signals from Equation (6), and concluding with classifiers trained on the feature signals from Equation (7).

Although each trained classifier uses the same confidence threshold in the embodiment described above, different thresholds may instead be used in different classifiers. For example, a different confidence threshold may be used for each of the different object sizes and/or for each of the different classification stages to achieve desired results.

Different configurations for the set of classifiers are also possible, including setting some classifiers to have a higher impact on classification decisions than others. For example, a voting system may be implemented in which a particular object is not classified as a red-eye object or a noise object unless at least a predetermined number of classifiers make an identical classification decision.

Figure 8:
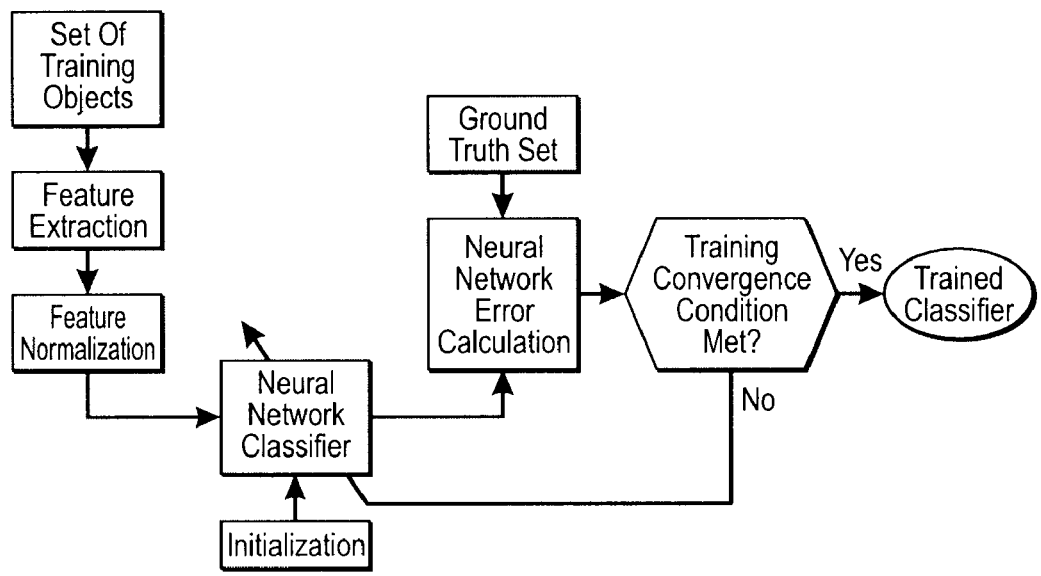
FIG. 8 is a functional diagram of an example neural network classifier undergoing training.

FIG. 8 is a diagram with functional and method blocks depicting the training of an NNC prior to operation using a suitable back-propagation algorithm. A training data set may be chosen to appropriately represent a variety of true and false red-eyes to improve classification accuracy. Prior to training, each NNC may first be initialized. As part of initialization, the weights $w_{m,p,n-1}$ of each neuron in the classifiers may be randomly generated. An NNC undergoing training may then be fed by numerous feature vectors. Training the NNC may include computing an output based on a current setting of weights $w_{m,p,n-1}$ and calculating a difference between the calculated output and the target (i.e., ground truth) value to generate an error term. The error term may then be propagated back through the NNC using the derivative of the neuron's activation function, thus modifying the weight settings $w_{m,p,n-1}$.

Training may be performed with the objective of minimizing an error criterion $\epsilon$, where the error criterion $\epsilon$ is a measure of the number of successfully classified objects compared to a total number of input objects. Thus, the error criterion can be expressed as $$\varepsilon = \left( \sum_{X=1}^{N_{TOT}} x_{1,\omega}^X \approx GroundTruth^X \right) / N_{TOT}$$

where $x_{1,\omega}^X$ is the classifier's output confidence level with respect to object $O_X$, $GroundTruth^X$ is the ground truth value for object $O_X$, and $N_{TOT}$ is the total number of objects used for the training. The relation $x_{1,m}^X \approx GroundTruth^X$ returns one when the object $O_X$ is classified correctly or it returns zero when $O_X$ was classified incorrectly. To expedite convergence, two predetermined thresholds may be used in the training stage. Thus, for $O_X$ to be classified during the training as a red-eye object, the output confidence level $x_{1,\omega}^X$ should satisfy $x_{1,\omega}^X > Y^{max}$. Analogously, for $O_X$ to be classified as a non-red-eye object, $x_{1,\omega}^X$ should satisfy $x_{1,\omega}^X < Y^{min}$. For $Y^{min} \leq x_{1,\omega}^X \leq Y^{max}$, the NNC may be considered to have a low confidence, thus increasing $\epsilon$. In one embodiment, the confidence threshold parameters may be set to $Y^{min}=0.1$ and $Y^{max}=0.9$. The training process described above may be repeated until a convergence criterion (e.g., 98% correct classification) or an iteration maximum (e.g., 10,000 training epochs) is met.

As noted above, classifiers may be trained using objects of a particular range of sizes so as to be adapted to classify objects within the particular range. In addition or alternatively, classifiers may be trained using a particular feature vector so as to be adapted to classify objects based on that particular feature vector. For example, using each of the four triples of feature signals from Equation (4) to (7) to constitute a unique feature vector type, four corresponding classifiers may be trained. The use of three (large, medium, small) object-size classes per feature vector type results in a total of twelve classifiers being trained, as depicted in the functional block diagram 100 of FIG. 1.

III. Classification of Objects Using a Simple Classifier

Referring again to FIG. 2, at 208 a simple classifier may be used to further refine the set of objects after elimination of false red-eye objects using the trained classifier at 206. A simple classifier may differ from a trained classifier in that the simple classifier may use one or more simple rules and much less parameters and calculations than that of a trained NNC, thus suggesting that the processing speed of a simple classifier can be much higher than that of a trained classifier. Because of its relative simplicity and low number of parameters to optimize, no optimization framework is required to obtain a reasonable classification performance of a simple classifier, as good classification results are relatively easily achievable by experimenting with parameters of a simple classifier on a trial and error basis.

Any feature signal, including those used in trained NNC-driven classification, can be used for this fast classification. The redness feature $F_{(\cdot,\cdot)}^{10}$ from Equation (7), for example, may be used to indicate whether an object is a true red-eye objects as follows:

$$O_i = \begin{cases} \{d_{(r,s)}^i = 0; (r,s) \in \Phi_i\} & \text{if } \max\{\Gamma_{i,1}, \Gamma_{i,2}, \Gamma_{i,3}, \Gamma_{i,4}\} \geq \Gamma_{O_i} \text{ and} \\ & \max\{\Gamma_{i,5}, \Gamma_{i,6}, \Gamma_{i,7}, \Gamma_{i,8}\} \geq \Gamma_{O_i}; \\ O_i & \text{otherwise} \end{cases} \quad (15)$$

where $$\Gamma_{i,h} = \frac{1}{|\Phi_i^R|} \sum_{(r,s) \in \Phi_i^R} F_{(r,s)}^{10}, \text{ for } R = 1, 2, \ldots, 8 \quad (16)$$

denotes the average redness of pixels $x_{(\cdot,\cdot)}$ in the feature region $\Phi_i^R$, with $|\Phi_i^R|$ denoting the number of pixel locations in $\Phi_i^R$. In addition, the term $$\Gamma_{O_i} = \frac{1}{|\Phi_i|} \sum_{(r,s) \in \Phi_i} F_{(r,s)}^{10} \quad (17)$$

denotes the average redness of pixels $x_{(\cdot,\cdot)}$ in the object $O_i$.

In Equation (15), $\max\{\Gamma_{i,1}, \Gamma_{i,2}, \Gamma_{i,3}, \Gamma_{i,4}\} \geq \Gamma_{O_i}$ and $\max\{\Gamma_{i,5}, \Gamma_{i,6}, \Gamma_{i,7}, \Gamma_{i,8}\} \geq \Gamma_{O_i}$ are two comparisons used to identify candidate red-eye objects with less significant redness compared to the object's corresponding inner and outer feature regions. If both conditions are satisfied, then the object $O_i$ may be classified as a noise object.

A simple classifier, such as one described above, may aid in catching false positives that trained classifiers miss because of their unique training. For example, red-eye objects having characteristics matching those of a set of training red-eye objects may be classified correctly by the trained classifiers. However, objects can have a vast variety of unusual characteristics that a finite training set cannot adequately represent. Thus, a noise object having characteristics similar to those of red-eye objects in a training set may falsely be classified as a red-eye object by a trained classifier whereas the simple classifier, not being trained to recognize such characteristics, may instead successfully classify this object as a noise object.

IV. Refinement of Classification Results

Next, at 210 and 212, further refinement acts may be performed on the trained classifier results. For example, at 210 an act of eliminating a false red-eye object from the set of candidate red-eye objects based on spatial proximity of objects may be performed, and, at 212, an act of eliminating a false red-eye object based on green and blue intensity levels in the object may be performed. Although processing by the trained and simple classifiers can greatly reduce, if not completely eliminate, false positives in a digital image, some images may still contain a small number of false positives. For example, this can happen in eye areas with several candidate red-eye objects or for objects which are not differentiable based on the feature signals used by classifiers. In order to eliminate such false positives, the objects retained as candidate red-eye objects after the previously described stages may undergo the procedures described below in sections IV.A and IV.B.

A. Removal of False Positives Near a True Red-Eye Object

Figure 9:
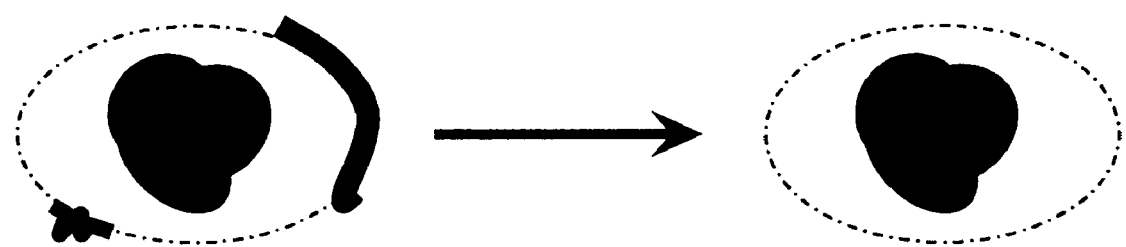
FIG. 9 discloses an example configuration of candidate red-eye objects and removal of false red-eye objects.

FIG. 9 shows an example configuration of candidate red-eye objects that can occur in an eye area. In some images, a true red-eye object can be surrounded by one or more false positive objects, as shown on the left side of FIG. 9. Objects corresponding to the iris, a corner of the eye, or an eye area in a low-quality image, among others, may falsely be classified as candidate red-eye objects. Such candidate objects may not have been removed in previous classification stages due to the neighboring area having image statistics and characteristics similar to those of the nearby true red-eye object.

Since, in the above scenario, the spatial distance between the true red-eye object and the corresponding local false positive objects is small, the objects are connectable by performing a morphological dilation on the binary map d. For example, let $N_O$ objects $\{O_{i,t}; t=1, 2, \ldots, N_O\}$ from the original set of objects $\{O_i; i=1, 2, \ldots, N\}$ be connectable by performing a morphological dilation on d. Next, a new object $O=\{(r,s) \in \Phi; d_{(r,s)}=1\}$ may be identified that includes all the original candidate red-eye objects from the subset $\{O_{i,t}; t=1, 2, \ldots, N_O\}$. Note that in the above notation, i denotes the index of the object $O_{i,t}$ in the original set whereas t denotes the index of the object in the subset under consideration. To correctly identify the noise objects, object shape characteristics may be used to rank a red-eye likelihood of each object in $\{O_{i,t}; t=1, 2, \ldots, N_O\}$ as follows:

$$\Xi_{i,t} = W_1 \frac{|\Phi_{i,t}|}{\max\{\forall |\Phi_{i,t}|\}} + \quad (18)$$

$$W_2 \frac{\max\{\forall E_{i,t}\} - E_{i,t}}{\max\{\forall E_{i,t}\}} + W_3 \frac{|\Phi_{i,t}|/(\Phi_{i,t}^y \Phi_{i,t}^x)}{\max\{\forall (|\Phi_{i,t}|/(\Phi_{i,t}^y \Phi_{i,t}^x))\}}$$

where $|\Phi_{i,t}|$ denotes the number of red pixels in the area $\Phi_{i,t}$ (e.g., where $x_{(r,s)1} > x_{(r,s)2}$ and $x_{(r,s)1} > x_{(r,s)3}$ for $(r,s) \in \Phi_{i,t}$) corresponding to the object $O_{i,t}$ with a bounding box $\phi_{i,t}^y \times \Phi_{i,t}^x$. The term $$E_{i,t} = \sqrt{\left(\frac{1}{|\Phi|}\sum_{(r,s)\in\Phi} r - \frac{1}{|\Phi_{i,t}|}\sum_{(r,s)\in\Phi_{i,t}} r\right)^2 + \left(\frac{1}{|\Phi|}\sum_{(r,s)\in\Phi} s - \frac{1}{|\Phi_{i,t}|}\sum_{(r,s)\in\Phi_{i,t}} s\right)^2} \quad (19)$$

denotes the Euclidean distance between the center of mass of the dilation result O and the center of the object under consideration $O_{i,t}$.

In Equation (18), the first term weighted by $W_1$ includes the number of pixels contained in $O_{i,t}$ and therefore corresponds to a relative size of the object $O_{i,t}$. Noise objects in $\{O_{i,t}; t=1, 2, \ldots, N_O\}$ are likely to be smaller than the true red-eye object; therefore, the first term in Equation (18) attributes a high red-eye likelihood to large objects. The second term in Equation (18), weighted by $W_2$, corresponds to a relative distance of the object $O_{i,t}$ under consideration from the center of the dilated object O obtained by dilating $\{O_{i,t}; t=1, 2, \ldots, N_O\}$. An object that is further from the center than others is likely to be a noise object. Finally, the third term in Equation (18), weighted by $W_3$, addresses a special case where two or more objects in $\{O_{i,t}; t=1, 2, \ldots, N_O\}$ have the same pixel count $|\Phi_{i,t}|$ and same distance $E_{i,t}$ from center of O. In this case, a compact object with relatively similar width and height is more likely to be a true red-eye than an object with one dimension significantly larger than the other. The contribution of the three terms to the overall measure $\Xi_{i,t}$ in Equation (18) may be controlled through predetermined weights $W_1$, $W_2$ and $W_3$. Acceptable results can be achieved by setting the weights to, e.g., $W_1=2/3$, $W_2=1/6$, and $W_3=1/6$.

Since the true red-eye object among all objects in the set $\{O_{i,t}; t=1, 2, \ldots, N_O\}$ should be attributed the highest likelihood by Equation (18), the false positive objects may be eliminated as follows:

$$O_i \begin{cases} \{d^i_{(r,s)} = 0; (r,s) \in \Phi_i\} & \text{if } t \neq \text{argmax}\{\forall \Xi_{i,t}\}; \\ O_i & \text{otherwise} \end{cases} \quad (20)$$

The right side of FIG. 9 shows the set of neighboring objects $\{O_{i,t}; t=1, 2, \ldots, N_O\}$ after the false positive objects have been removed by application of Equation (20).

B. Removal of False Positives Using Green and Blue Correlation

Further reduction of false positives can be achieved by evaluating the candidate red-eye objects as follows:

$$O_i = \begin{cases} \{d^i_{(r,s)} = 0; (r,s) \in \Phi_i\} & \text{if } \delta^{GB}_i \geq \Gamma_\delta; \\ O_i & \text{otherwise} \end{cases} \quad (21)$$

where $\Gamma_\delta$ is a predetermined threshold and $$\delta^{GB}_i = \frac{1}{|\Phi_i|} \sum_{(r,s)\in\Phi_i} |x_{(r,s)2} - x_{(r,s)3}| \quad (22)$$

denotes the average absolute difference between green and blue components of redness of the object $O_i$. The rationale underlying this type of classification is that the iris area of a true red-eye is likely to have similar intensities in both green and blue channels. Acceptable accuracy of the classification process in Equation (21) can be achieved by setting $\Gamma_\delta=45$.

V. Alternative Embodiments

In addition to the various alternatives described above, various other versions of functional block diagram 100 and method 200 may be implemented including versions in which various acts and corresponding blocks are modified, omitted, or added or in which the order of the depicted acts/blocks differ.

In the functional block diagram 100, for example, the trained NNCs 106-112 and the object size discriminator 104 may be omitted or reordered with respect to the other functional blocks 114-118 to receive and classify the outputs of any one of functional blocks 114-118. Similarly, one or more of functional blocks 114-118 may be omitted or reordered with respect to each other or with respect to the trained NNCs 106-112 and the object size discriminator 104. These varying arrangements are feasible because, except for the object size discriminator 104, each of the functional blocks in FIG. 1 perform a similar function—eliminating false red-eye objects from the set of candidates. Moreover, the trained NNCs 106-112 may be reduced to a set of fewer NNCs trained for fewer object sizes and/or fewer feature vectors, including an embodiment in which only one NNC is used to classify objects of all sizes with one or more feature vectors. Similar corresponding modifications may be made to method 200 in FIG. 2.

The example embodiments disclosed herein may be embodied in other specific forms. The example embodiments disclosed herein are to be considered in all respects only as illustrative and not restrictive.

What is claimed is:

1. A method for red-eye detection in an image, the method comprising the acts of:
   receiving a set of candidate red-eye objects identified in the image;
   extracting features from the candidate red-eye objects; and
   eliminating a false red-eye object from the set of candidate red-eye objects with a plurality of classifiers based on the extracted features,
   wherein first and second ones of the plurality of classifiers are optimized for classifying objects in a first range of sizes using first and second ones of the extracted features, respectively, and
   wherein third and fourth ones of the plurality of classifiers are optimized for classifying objects in a second range of sizes using the first and second ones of the extracted features, respectively.

2. The method of claim 1, wherein at least one of the first through fourth classifiers is a neural network classifier.

3. The method of claim 1, wherein at least one of the plurality of classifiers is a simple classifier.

4. The method of claim 1, wherein the extracted features include features corresponding to a plurality of regions associated with each of the candidate red-eye objects.

5. The method of claim 4, wherein the extracted features include mean and standard deviation values of features in each region.

6. A system for red-eye detection in an image, the system comprising:
   an object size discriminator configured to receive a group of candidate red-eye objects and to generate therefrom a first set of objects having a first range of sizes and a second set of objects having a second range of sizes;

a first plurality of feature extractors and corresponding trained classifiers configured to eliminate false red-eye objects from the first set of objects;

a second plurality of feature extractors and corresponding trained classifiers configured to eliminate false red-eye objects from the second set of objects;

a simple classifier configured to eliminate false red-eye objects from the objects remaining in the first and second sets of objects after elimination by the trained classifiers;

a filter configured to eliminate false red-eye objects from the objects remaining after elimination of objects by the simple classifier.

7. The system of claim 6, wherein the first plurality of feature extractors and trained classifiers are arranged in a cascaded configuration, wherein the second plurality of feature extractors and trained classifiers are arranged in a cascaded configuration, and wherein the first and second cascaded pluralities of feature extractors and trained classifiers are arranged in a parallel configuration with respect to each other.

8. One or more non-transitory computer-readable media having computer-readable instructions thereon which, when executed, implement a method for processing an image to detect red-eye effects, the method comprising the acts of:

receiving a set of candidate red-eye objects identified in the image;

extracting features from the candidate red-eye objects; and eliminating a false red-eye object from the set of candidate red-eye objects with a plurality of classifiers based on the extracted features, wherein first and second ones of the plurality of classifiers are trained for classifying objects in a first range of sizes using first and second ones of the extracted features, respectively, and wherein third and fourth ones of the plurality of classifiers are trained for classifying objects in a second range of sizes using the first and second ones of the extracted features, respectively.

9. An image processing device comprising:

a processor; and the one or more non-transitory computer-readable media as recited in claim 8, the computer-readable instructions thereon being configured to be executed by the processor.

10. The image processing device as recited in claim 9, wherein the image processing device comprises a printer, a scanner, a digital camera, a digital camcorder, a portable photo viewer, or some combination thereof.

\* \* \* \* \*